Feb. 8, 1966 W. VOLLMAN 3,233,262
METHOD OF PRODUCING LOCKNUTS BY ASSEMBLING LAMINAE IN A HOUSING
Filed Feb. 18, 1963 2 Sheets-Sheet 1

WALTER VOLLMAN
INVENTOR.

BY
ATTORNEY

Feb. 8, 1966   W. VOLLMAN   3,233,262
METHOD OF PRODUCING LOCKNUTS BY ASSEMBLING LAMINAE IN A HOUSING
Filed Feb. 18, 1963   2 Sheets-Sheet 2

WALTER VOLLMAN
INVENTOR.

BY
ATTORNEY

United States Patent Office 3,233,262
Patented Feb. 8, 1966

3,233,262
METHOD OF PRODUCING LOCKNUTS BY ASSEMBLING LAMINAE IN A HOUSING
Walter Vollman, 207 Southern Blvd., Chatham, N.J.
Filed Feb. 18, 1963, Ser. No. 259,226
2 Claims. (Cl. 10—86)

This invention relates to self-locking nuts and more particularly to a self-locking nut of simple and economical construction and of high mechanical strength.

Various constructions of self-locking nuts are known. One known type of self-locking nut comprises a cup-shaped housing containing a metal nut member and a fibrous locking member held in place in the housing by inturned tabs which are integral with the wall portions of the housing. One shortcoming of such devices lies in the fact that after an indeterminate number of uses, the threads in the fibrous member become enlarged, due to wear or deformation, thereby losing its locking property. Other known types of self-locking nuts comprise all metal elements wherein the threads of the nut member are arranged to interlock themselves with the threads of a cooperating screw or bolt. In certain of these devices, the thread-interlocking action occurs only after the nut is deformed by pressure exerted thereon by a surface against which the nut is brought into abutting contact, thereby limiting the uses for which the device may be used. Other devices of the all-metal class depend for the locking action upon relatively displaced threads formed in two nut members which are conjointly threaded upon the bolt. These are costly to produce and not too convenient to use.

Further, the size of a bore which can be punched in a metal nut member is limited by the thickness and width of the material of which the member is formed. In consequence, metal self-locking nuts designed for heavy duty use include one or more members formed on a screw machine. Even in such case, the tapping of a thread in a nut of substantial thickness presents problems of tool life and thread uniformity arising by reason of the formation of long, curled chips, particularly in high speed operations as are required to reduce the cost of producing the nut to a minimum. Additionally, there is the problem of deforming or displacing one or more of the threads to provide a self-locking nut.

An object of this invention is the provision of an improved, self-locking nut, of the all-metal class, wherein all of the components are made by punching operations.

An object of this invention is the provision of an all-metal, self-locking nut adapted for heavy duty use which nut will not loosen under vibration when the bolt is threaded through the nut, even though the nut is not seated against a surface.

An object of this invention is the provision of a self-locking nut made up of a series of punched monoplanar laminae assembled within a cup-shaped housing and wherein the threads formed in certain laminae are displaced or axially out of phase relative to those formed in the other laminae.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference numerals denote like parts in the several views.

Figure 1:
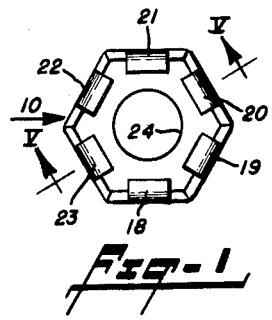
FIGURE 1 is a top view of a self-locking nut made in accordance with this invention.
Figure 2:
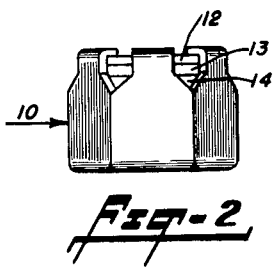
FIGURES 2 and 3 are, respectively, side and bottom views thereof.
Figure 3:
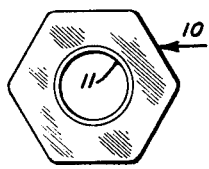
Figure 4:
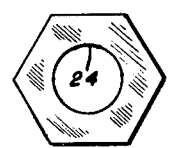
FIGURE 4 shows one of the laminae.

Referring, now, to FIGURES 1–3, a self-locking nut made in accordance with this invention comprises a hexagonal housing 10 having a central hole 11 formed in the bottom wall. A plurality of hexagonal laminae 12, 13 and 14 are positioned within the housing, a representative one of such laminae being shown in FIGURE 4. These laminae are retained in firm, face-to-face abutting relation by means of the inturned tabs 18–23 which tabs are integral with the housing side walls. The laminae are punched from flat stock and include a central hole 24. The housing is similarly punched and drawn to the illustrated cup-shape. It may here be pointed out that the wall defining the hole 11, in the housing, is beveled to facilitate the entry of a tap thereinto.

Figure 5:
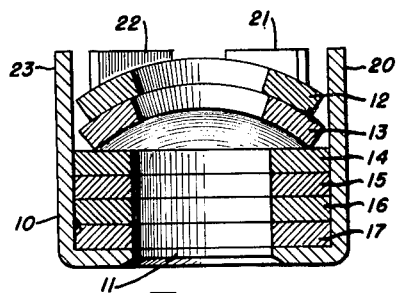
FIGURE 5 is a cross-sectional view taken along the line V—V of FIGURE 1, but drawn to an enlarged scale and showing the first step in the assembly of the nut.

Reference, now, is made to FIGURE 5 which is a cross-sectional view taken essentially along the line V—V of FIGURE 1 but drawn to an enlarged scale and showing the first step in the assembly of the lock nut. First, four flat or monoplanar, hexagonal laminae 14–17 are dropped into the housing and then two upper laminae 12 and 13 are added. However, whereas the lower laminae 14–17 are flat, the upper laminae 12 and 13 are slightly bowed, or dish-shaped, in the present embodiment, and positioned with their concave sides down or facing the monoplanar laminae. Since all laminae are hexagonal in shape and of a size to fit snugly within the housing, it will be apparent only a slight, if any, rotational movement can take place between the laminae and the housing.

Figure 6:
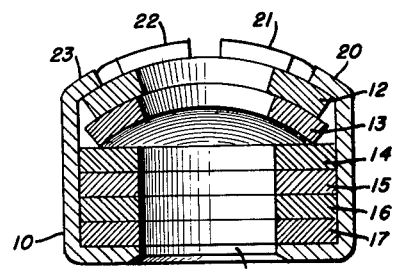
FIGURE 6 is similar to FIGURE 5 and showing the second step in the assembly operation.

The assembly shown in FIGURE 5 is then placed into a suitable fixture and the integral housing tabs, or ears, 18–23, are turned inwardly into engagement with the upper bowed laminae 12, as shown in FIGURE 6, thereby preventing axial movement between the laminae. Such assembly now is ready for the tapping operation.

Figure 7:
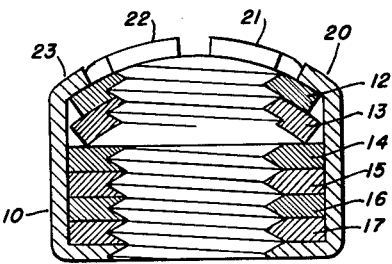
FIGURE 7 is similar to FIGURE 6 and shows the formation of the threads in the laminae.

The assembly shown in FIGURE 6 is clamped in a suitable fixture, or chuck, and a thread-cutting tap is passed through the aligned holes of the laminae, entering through the hole 11 in the bottom wall of the housing. Inasmuch as the laminae are securely confined against rotary and axial movement relative to each other and to the housing, the thread cut in the laminae will appear as shown in FIGURE 7. One most practical advantage afforded by this particular construction of the nut is the fact that the metal chips, generated by the cutting away of the metal by the tap in the formation of the thread, are broken at the interface between adjacent laminae. Consequently, the chips are relatively small and readily pass outwardly along the tap flutes, thereby permitting high speed tapping, without damage to the tap or to the thread being formed.

Figure 8:
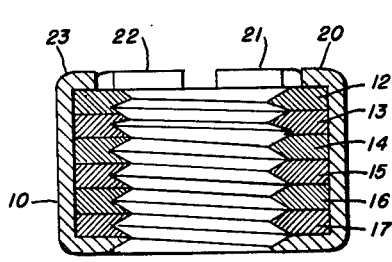
FIGURE 8 is similar to FIGURE 7 and showing the completed nut.

After the formation of the continuous thread, as shown in FIGURE 7, the unit is again placed in a suitable fixture and the housing tabs are then pressed inwardly to the fullest possible extent, as shown in FIGURE 8. This forces the normally-bowed laminae 12 and 13 into monoplanar configuration and all laminae into tight, face-toface engagement. When the initially bowed, upper laminae are so flattened, the thread portion formed therein is axially displaced or positioned out of phase relative to the thread portion formed in the normally flat, lower laminae. The amount of such relative thread displacement depends upon the extent to which the upper laminae are bowed before the thread-forming operation, as will now be explained with specific reference to FIGURES 9–11.

Figure 9:
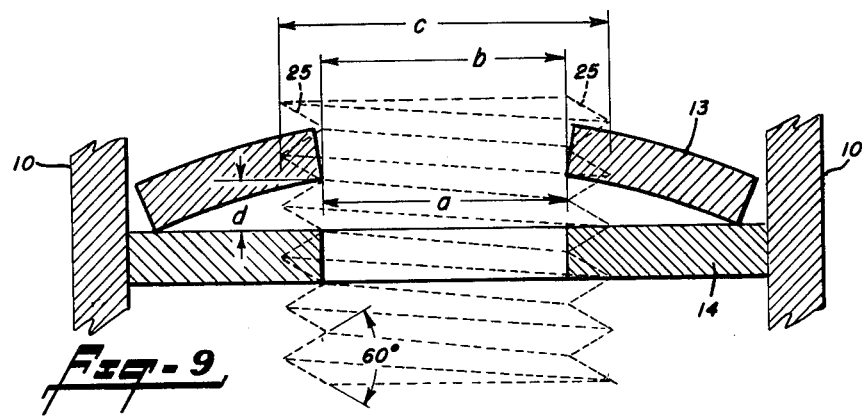
FIGURES 9–11 are enlarged, fragmentary views to show the relation between the threads formed in the laminae.
Figure 10:
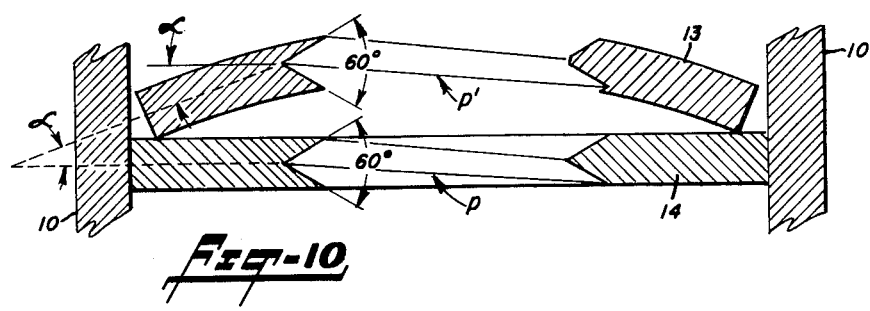

FIGURE 9 shows the uppermost flat lamina 14 and the adjacent, initially-bowed lamina 13. Each of these laminae are punched from flat stock with holes of equal diameter $a$. The lamina 13 is then pressure-deformed into the bowed, or dish, shape. This causes a slight expansion of the hole diameter at the convex surface with no significant change in the hole diameter at the concave surface. The tap (indicated by the dotted lines 25) is now passed through the laminae, the tap threads having a 60 degree angle, a root diameter $b$ and an outside (maximum) diameter $c$. When the tap is withdrawn, the threads formed in the laminat will be as shown in FIGURE 10. For corresponding incremental sections taken through the laminae (as is shown in the central cross-sectional view of FIGURE 10), the tooth angle of the thread is bisected by the thread pitch line. Specifically, the 60 degree tooth angle formed in the flat lamina 14 is bisected by the pitch line $p$ and the similar angle in the tooth formed in the bowed lamina 13 is bisected by the pitch line $p'$. Obviously, the pitch lines $p$ and $p'$, in FIGURE 10, are parallel. Further, the relative planar orientation of the two laminae can be defined by the angle $\alpha$.

Figure 11:
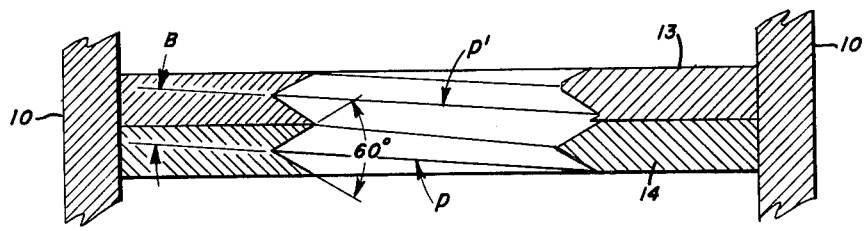

Now, when the bowed lamina 13 is flattened to lie in a plane parallel to that of the flat lamina 14, as shown in FIGURE 11, the two pitch lines $p$ and $p'$ are no longer parallel and the tooth angle of the thread in the lamina 13 is tilted, or canted, relative to that of the thread in the lamina 14, by an angle $\beta$ which depends upon the angle at which the two laminae were oriented during the thread forming operation. Although there may be some flow of the metal during the deformation of a flat lamina into the dish-shape and the subsequent flattening thereof, the root and minimum diameters of the thread formed in the bowed lamina remain essentially the same after the lamina is flattened.

In FIGURES 9–11, the lamina 13 has been bowed to an extent wherein the axial spacing $d$, along the root diameter of the tap thread (see FIGURE 9) is equal to the thread pitch. Consequently, when the bowed lamina is flattened, its thread will mate with that of the flat lamina 14 at the parting line between the laminae. Thus, when a bolt is threaded through the two laminae, a thread interlocking action is effected between the threads of the bolt and the tilted, or canted, thread of the lamina 13. It will be apparent, however, that the distance $d$ may be different from the tap thread pitch. In such case, when the lamina 13 is flattened, its thread angle will be tilted to a greater or lesser extent relative to that of the thread in the lamina 14. Further, the two threads will be axially displaced relative to each other at the parting line between the lamina. The effect of such axial thread displacement is cumulative with the relative canting of the two thread portions to provide an increased locking action upon the bolt thread.

As shown in FIGURE 8, the locknut consists of four flat laminae and two, initially bowed laminae. A bolt will pass freely along the thread portion of the lower laminae 14–17 and will interlock with the thread portion of the upper laminae 12, 13. The torque required to thread the bolt completely through the nut will depend upon the described relative tilt and axial displacement of the two thread portions, as well as the number and thickness of the initially bowed laminae. On the other hand, the shear strength of the nut, that is, the axial pressure required to strip the nut from the bolt, will depend upon the total number of threads of the nut. In this respect, it will be noted that the total thread of the nut includes a thread portion formed in the bottom wall of the housing, thereby increasing the shear strength of the unit as a whole.

Figure 12:
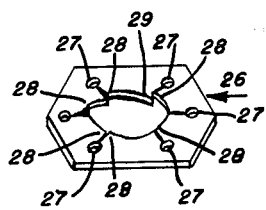
FIGURE 12 is an isometric view showing another form of the upper lamina.

Reference, now, is made to FIGURE 12, wherein there is shown a hexagonal lamina 26 having a central hole therein as well as the small holes 27 formed proximate to the six corners thereof. The material is fractured along radial lines terminating at the holes 27 and the resulting sections are twisted in such manner that the forward edge 28 of each section is above the plane of the lamina and the rear edge 29 is below such plane. Those skilled in this art will understand that the illustrated lamina is formed by punching operations. One or more of such lamina may be used in place of the bowed lamina 12, 13 shown in FIGURES 5–8. After the continuous thread has been formed, the housing ears are pressed inwardly to the fullest possible extent whereby the twisted sections of the upper lamina, or laminae, are flattened. This results in a more complex canting, or tilting, of the threads in the laminae 26 to effect the interlocking action with the bolt thread. In the case of laminae 26, the housing ears 18–20 preferably are somewhat longer to assure the complete flattening of the laminae in the finished nut.

A self-locking nut, as described, does not rely upon the seating thereof against a flat surface for its gripping action on the bolt. Therefore, such nut can be threaded to any position along the bolt and it will remain in such position under severe vibration conditions. Further, all elements of the nut remain fixed during use thereof, that is, there is no bending, flexing or distortion of any element to effect the gripping action on the bolt. Still further, there is no thread-cutting action by the bolt as it is threaded on the nut, as in the case of lock-nuts having fibrous or similar inserts, whereby the nut may be used many times without loss of the locking action. By proper design, the relative axial displacement and canting of the two thread portions of the nut can be made such that the thread portion formed in the initially deformed laminae substantially completely and uniformly fills the space between the threads of the bolt, thereby tremendously increasing the axial shear strength between the bolt and nut.

As stated hereinabove, all elements of the nut can be formed by punching operations thereby promoting economy of manufacture. The wall thickness of the housing and the thickness of the individual laminae may be varied in accordance with the particular use for which the nut is made. Also, the material of which the laminae and housing are made may be selected to match the specification of standard bolts. In the case of heavy duty locknuts, that is, those designed to have a high shear stress, the housing and the laminae can be made of tool steel and hardened after the nut is completely made. Although the drawings illustrate a nut comprising four flat laminae and two initially-bowed laminae, it is apparent that a greater or lesser number of the two different laminae may be utilized. Also, the number of threads formed in the individual laminae and the shape of the housing are subject to a wide latitude in design choice. Still further, the number of tabs which are turned inwardly to flatten out the initially deformed laminae need not correspond to the number of the housing side walls.

Having now given a detailed description of the improved, self-locking nut and the method of manufacturing same, those skilled in this art will be able to make further changes and modifications without thereby departing from the scope and spirit of the invention as recited in the following claims.

I claim:

1. A method of making a self-locking nut comprising,
   (a) forming a cup-like metal housing of polygonal shape with a central hole in the bottom wall and slots in the wall corners at the open end, (b) forming a first set of monoplanar, metal laminae having central holes therein and a second set of metal laminae having corresponding central holes therein but central portions deformed from the monoplanar condition, each set of laminae corresponding in peripheral shape to the housing, (c) placing the first and second sets of laminae in the housing in stacked arrangement so that deformed portions of the second set are axially spaced from the first set, (d) turning the end portions of the housing side walls inwardly into engagement with the surface of the uppermost deformed lamina, (e) forming a continuous thread in the walls defining the holes in the laminae, and (f) turning the said end portions of the housing inwardly to the fullest possible extent thereby flattening the said deformed set of laminae, so that the thread portions of the second set of laminae will be axially out of phase with respect to the thread portions of the first set.

2. The invention as recited in claim 1, wherein the second set of laminae are dish shaped and positioned with the concave side adjacent the top of the first set of laminae.

References Cited by the Examiner

UNITED STATES PATENTS

| | | |
|---|---|---|
| 811,957 | 2/1906 | Rystrom. |
| 2,222,460 | 11/1940 | Crowley. |
| 2,318,397 | 5/1943 | Hungerford. |
| 2,540,759 | 2/1951 | Schneider _____ 151—22 |
| 2,616,474 | 11/1952 | Healy _____ 151—7 |
| 2,784,428 | 3/1957 | Curran. |
| 2,952,289 | 9/1960 | Kreidel. |

FOREIGN PATENTS

| | | |
|---|---|---|
| 877,871 | 1/1943 | France. |
| 826,469 | 1/1960 | Great Britain. |

ANDREW R. JUHASZ, *Primary Examiner.*

EWARD C. ALLEN, *Examiner.*